United States Patent [19]

Lips et al.

[11] Patent Number: 5,214,783
[45] Date of Patent: May 25, 1993

[54] DEVICE FOR CONTROLLING THE ENQUEUING AND DEQUEUING OPERATIONS OF MESSAGES IN A MEMORY

[75] Inventors: Jean-Pierre Lips, Cagnes sur Mer; Jean-Marc Millet, Vence; Bernard Naudin, Saint Laurent du Var, all of France

[73] Assignee: International Business Machines Corp., Armonk, N.Y.

[21] Appl. No.: 564,900

[22] Filed: Aug. 9, 1990

[30] Foreign Application Priority Data

Sep. 20, 1989 [EP] European Pat. Off. ........ 89480145.5

[51] Int. Cl.[5] ............................................ G06F 13/00
[52] U.S. Cl. ..................... 395/725; 395/250; 364/DIG. 1; 364/238.6; 364/239; 364/239.1; 364/239.51; 364/254.5
[58] Field of Search ............... 395/725, 425, 250, 325; 364/DIG. 1, DIG. 2

[56] References Cited

U.S. PATENT DOCUMENTS

| | | | |
|---|---|---|---|
| 4,285,038 | 8/1981 | Suzuki et al. | 395/325 |
| 4,482,956 | 11/1984 | Tallman | 395/250 |
| 4,486,854 | 12/1984 | Yuni | 395/425 |
| 4,584,640 | 4/1986 | MacGregor et al. | 395/600 |
| 4,584,644 | 4/1986 | Larner | 395/650 |
| 4,615,001 | 9/1986 | Hudgins, Jr. | 395/650 |
| 4,807,111 | 2/1989 | Cohen et al. | 395/250 |
| 4,965,716 | 10/1990 | Sweeney | 395/325 |
| 4,980,852 | 12/1990 | Giroir et al. | 395/775 |
| 5,081,572 | 1/1992 | Arnold | 395/375 |

FOREIGN PATENT DOCUMENTS

0273083  7/1988  European Pat. Off. .

Primary Examiner—Michael R. Fleming
Assistant Examiner—Ayaz R. Sheikh
Attorney, Agent, or Firm—Edward H. Duffield

[57] ABSTRACT

The subject device manages the access to message queues in a memory (6) by an enqueuer 2 and a dequeuer 7 when the enqueuer has priority over the dequeuer. It solves the contention problem raised when the dequeuer dequeues the last message from a queue while the enqueuer is enqueuing anew one. A queue control block QCB and queue status bits E, A, D are assigned to each queue and stored in memories 20 and 22. Each time dequeuer 7 performs a dequeuing operation it sets its D bit (dequeuer active) before updating the queue head field in the QCB block. When the enqueuer performs an enqueuing operation it sets an abort bit A, if it finds the D bit active and E bit active indicating that the queue contains at least one message to warn the dequeuer that it has to abort its process if it is dequeuing the last message from the queue.

8 Claims, 7 Drawing Sheets

DEVICE FOR CONTROLLING THE ENQUEUING AND DEQUEUING OPERATIONS OF MESSAGES IN A MEMORY

DESCRIPTION OF THE INVENTION

1. Field of the Invention

The present invention relates to a device for controlling the enqueuing and dequeuing operations of messages in a memory and more particularly to such a device which manages the accesses to a queue of chained messages by an enqueuing means and a dequeuing means so as to solve the contention problem which is raised when the last message is dequeued from the queue while a new one is being enqueued.

2. Background Art

It is well known in the data processing art to give a plurality of data processing units the capability of enqueuing and dequeuing elements to and from a queue located in a memory through pointers. To maintain the integrity of the queue, a lock has to be implemented between the data processing units.

One prior art technique consists in implementing the lock implemented via Test and Set or Compare and Swap instructions, which insure that only one unit may have access to the queue during an enqueuing or dequeuing operation.

Another technique consists in serializing the queue accesses. The units access the queue by issuing enqueuing or dequeuing commands processed by a queue management device executing only one command at a time so that a lock is implicitly implemented. U.S. Pat. No. 4,482,956 describes a device which makes use of the Compare and Swap instructions to perform element insertions and deletions in a queue and of an additional dequeue lock which is set on each time a unit dequeues an element to prevent any other unit from performing an element deletion at the same time.

These prior techniques cannot be implemented in systems where the enqueuing operations of one unit have priority over the dequeuing operations of the other units. For example, if a queue is assigned to a receiving unit of a communication system for enqueuing the incoming messages which are dequeued to be processed by a message processing unit of the communication system, the enqueueing operations can never be delayed.

OBJECTS OF THE INVENTION

An object of the invention is to provide a device capable of maintaining the integrity of the message queues and solving the problems raised when the message enqueuing and message dequeuing requests arise at times which lead to contention situations.

Another object of the invention is to provide such a device which is simple and does not impair the performances of the system incorporating it.

SUMMARY OF THE INVENTION

The invention relates to a device for managing the accesses by an enqueuing means and at least one dequeuing means to queues of chained messages in a first storing means, the position of each queue in the first storing means is indicated by a queue control block associated to the queue, the queue control block including head and tail fields, which are accessed by the enqueuing means to write the starting address of the first message into the head and tail fields to enqueue the first message and then to write the starting address of the next messages into the tail field to enqueue the next messages and by the dequeuing means to write the starting address of the next message in the queue into the head field each time a message is dequeued from the queue.

The device comprises:

a second storing means for storing the queue control blocks, a third storing means which contains queue status bits for each queue, including an empty status bit (E) having an empty and not empty state indicating that the queue is empty or not, an abort status bit having an abort state and not abort state and an active status bit having an active state and not active state, enqueuing control means which are responsive to a request for enqueuing a message to a selected queue raised by the enqueuing means to first update the tail field of the queue control block of the selected queue with the starting address of the message and then detect the state of the empty status bit and active status bit(s) of the selected queue to set the abort status bit to the abort state if the empty status bit and active status bit(s) are found in the not empty state and active states respectively and update the head field with the starting address of the message and set the empty status bit to its not empty state if the empty status bit is found in the empty state.

dequeuing control means which are responsive to a request for dequeuing a message from a selected queue raised by the dequeuing means to set the active status bit of the selected queue to its active status, then detect whether the queue contains only one message and if yes test the abort status bit and abort the dequeuing process if the said bit is found in the abort state or perform the dequeuing operation if the said bit is found in the not abort state and set the empty status bit to its empty state and the active status bit to its not active state;

whereby the contention problem raised when the last message is dequeued from a queue when a new one is being enqueued is solved.

DETAILED DESCRIPTION OF THE INVENTION

The present invention allows to solve the contention problems which often arise when a resource is needed by a plurality of devices to perform their operations. It will be more particularly described when implemented in a line adapter of a communication controller. In such an environment, the messages which are received from the network users attached to the line adapter have to be enqueued as soon as received, so that the enqueuing operation cannot be interrupted by any other operation and must have priority over any other operation.

Figure 1:
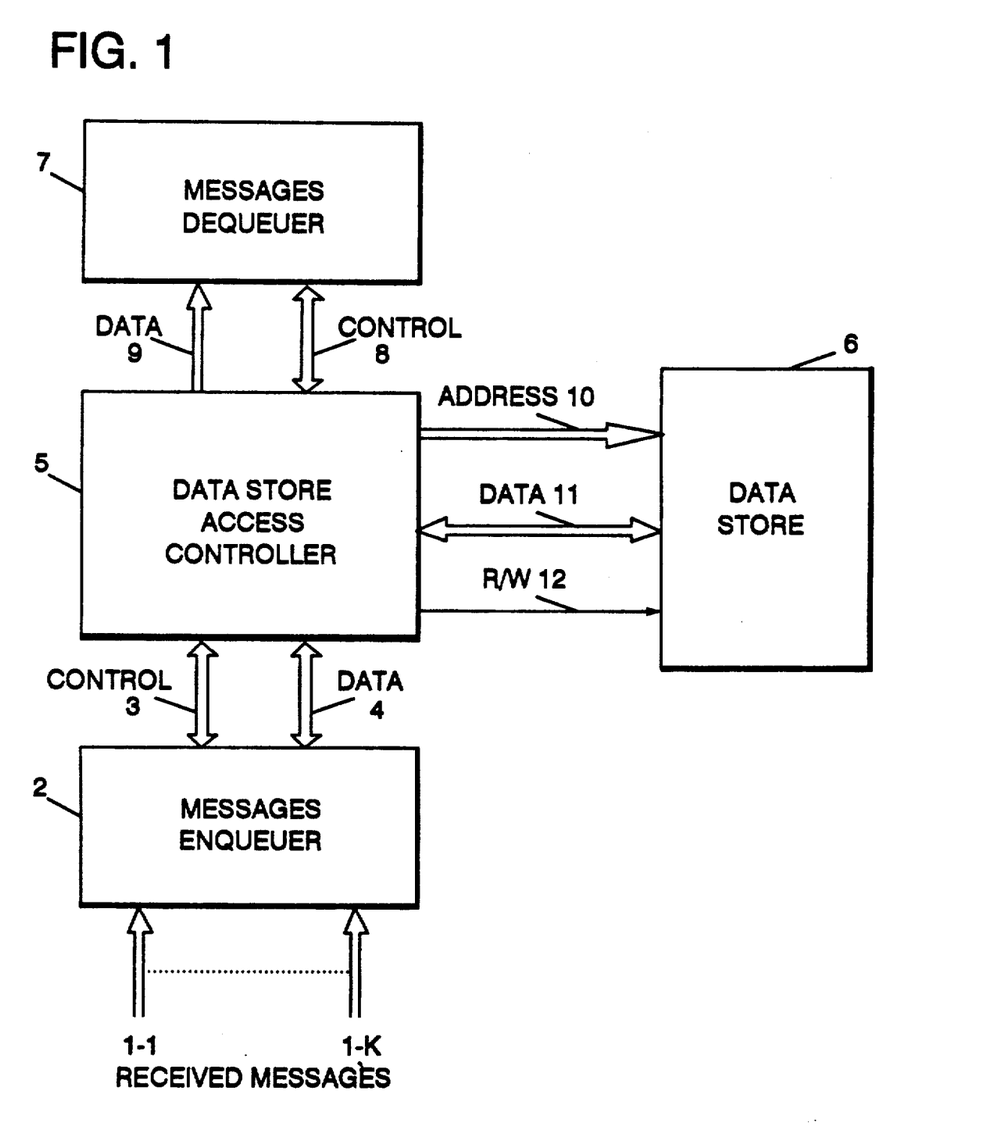
FIG. 1 shows a block diagram of a system incorporating the device of the subject invention.

As schematically shown in FIG. 1, the data are received from a plurality of k users from busses 1-1 to 1-k and assembled into messages which are chained together by message enqueuer device 2 and then enqueued to line inbound queues LIQ which are built in a data store 6. There is one line inbound queue LIQ per user built in data store 6. The accesses to data store 6 are controlled by a data store access controller 5 which exchanges access control information with message enqueuer 2 through control bus 3 and receives data to be written into the data store from a data bus 4.

The messages which are enqueued in the line inbound queues have to be dequeued to be passed to a message processing device (not shown in the Figure) to be processed by the communication controller. The message dequeuing operations are performed by a message dequeuer device 7 which exchanges access control information with the data store access controller 5 through a control bus 8 and receives the data read from the addressed location of the data store through a data bus 9.

The invention will be described assuming that there is only one message dequeuer device. It is explained at the end of the specification how the invention can be implemented when there are several message dequeuer devices.

The data store access controller 5 generates the address and read/write control signals on address bus 10 and line 12 respectively, from the control signals on busses 3 and 8. The data read from or to be written into an addressed location are carried between the data store 6 and data store access controller 5 by means of data bus 11.

The data store access controller 5, which will be described later on controls the memory accesses requested by the enqueuer and dequeuer devices 2 and 7 and solves the contention which arise in some cases because the link inbound queues are shared by two processing layers; the enqueuer device 2 and the dequeuer device 7.

Figure 2:
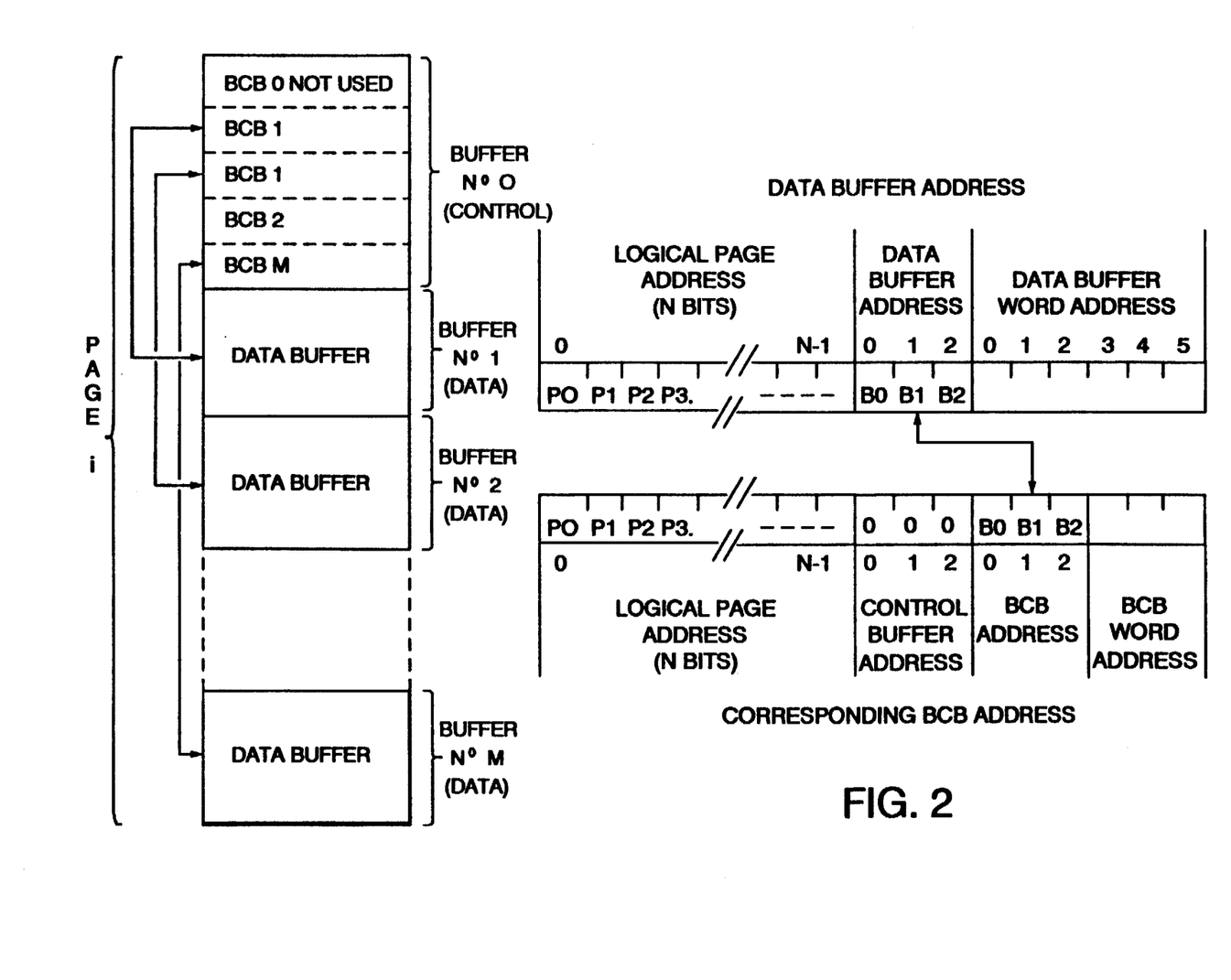
FIG. 2 shows the buffer organization of the data store 6 shown in FIG. 1.

In a preferred embodiment of the present invention, the link inbound queues are built into a data store 6 which is divided in logical pages which are arranged as shown in FIG. 2.

Each page "i" is divided into m+1 buffers, namely buffer 0, buffer 1.. and buffer m. The first buffer 0 is divided into m+1 control blocks, with one control block assigned to each buffer 1 to m.

In a typical implementation, the logical page comprises 512 4-byte words so that a logical page address corresponds to a 512 word boundary. One logical page comprises seven data buffers and one control buffer, each buffer comprising 256 bytes. The control buffer of a given logical page contains the buffer control blocks of the seven buffers of this page, so that there is a fixed and simple relationship between the address of a data buffer and the address of its corresponding control block BCB, which is shown in FIG. 2.

A data buffer address comprises a logical page address field containing n bits p0 to p(n−1) to address a given page, then a data buffer field address containing three bits b0, b1 and b2 (assuming that the page contains seven data buffers) and then a data buffer word address field.

The corresponding buffer control block BCB address comprises the same logical page address field, then three control buffer address bits which are set to 0 and then b0, b1 and b2 bits which address the corresponding BCB and a BCB word address which comprises three bits in the case a BCB comprises eight words. So, the address of a buffer control block can be easily derived from the corresponding data buffer address and vice versa.

Figure 3:
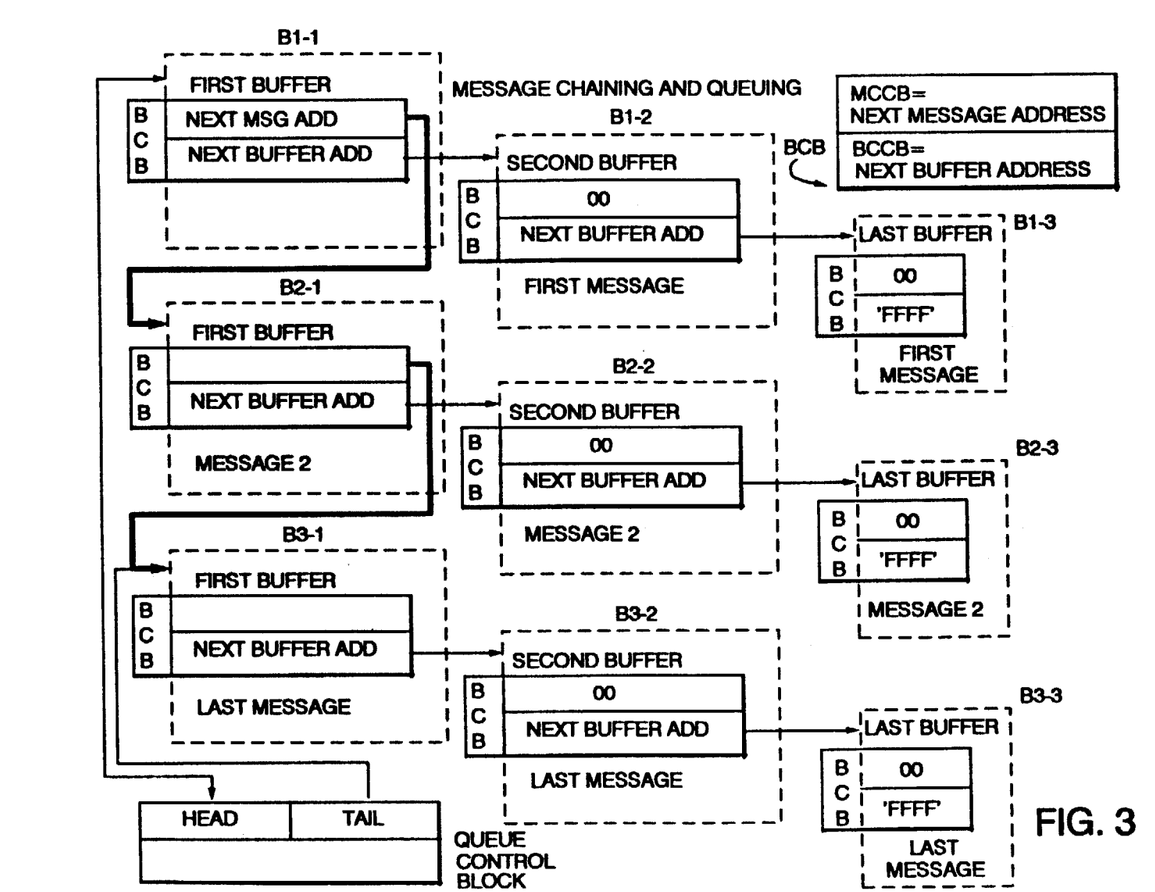
FIG. 3 shows how messages are chained and queued.

In the data store 6, a variable number of data buffers are chained together to be able to store messages of variable length: the chains of data buffers associated with a queue control block QCB constitute the line inbound queues. The buffer chaining is shown in FIG. 3. A message can be contained in several data buffers. Each buffer control block BCB associated to a data buffer is divided into two blocks: the BCCB block and MCCB block. The BCCB block contains information relating to the buffer chaining within a message and the MCCB block contains information relating to message chaining.

The message chaining control block MCCB comprises at least the address of the first buffer of the next message and the buffer chaining control block comprises at least the address of the next buffer.

FIG. 3 shows the chaining mechanism of three messages. The first message is chained in a plurality of buffers, three buffers B1-1 to B1-3 are shown in FIG. 3. The buffer chaining control block of the first buffer B1-1 of the first message stores the address of the second buffer B1-2 of the first message and the message chaining control block of the first buffer of the first message stores the address of the first buffer B2-1 of the second message, etc.

The address "FFFF" in the MCCB of the first buffer of a message means that this buffer is the first buffer of the last message of the queue and the address "FFFF" in the BCCB of a buffer means that this buffer is the last buffer of a message.

A queue control block QCB is assigned to each suer which can build a queue in the data store, messages are enqueued to a queue by writing the address of the first buffer of the first message in a head field of the QCB and the address of the first buffer of the last message in a tail field of the QCB.

The LIQ head field is written by:
  the enqueuer 2 when it enqueues the first message in the LIQ
  the dequeuer 7 when it dequeues any message from the LIQ, except the last.
The LIQ head field is read by:
  the dequeuer 7 when it dequeues a message.
The LIQ tail field is written by:
  the enqueuer 2 when it enqueues a message
The LIQ tail field is read by:
  the dequeuer 7 to know it dequeues the last message of the LIQ, (in this case LIQ-head=LIQ-tail).

Figures 4, 4B:
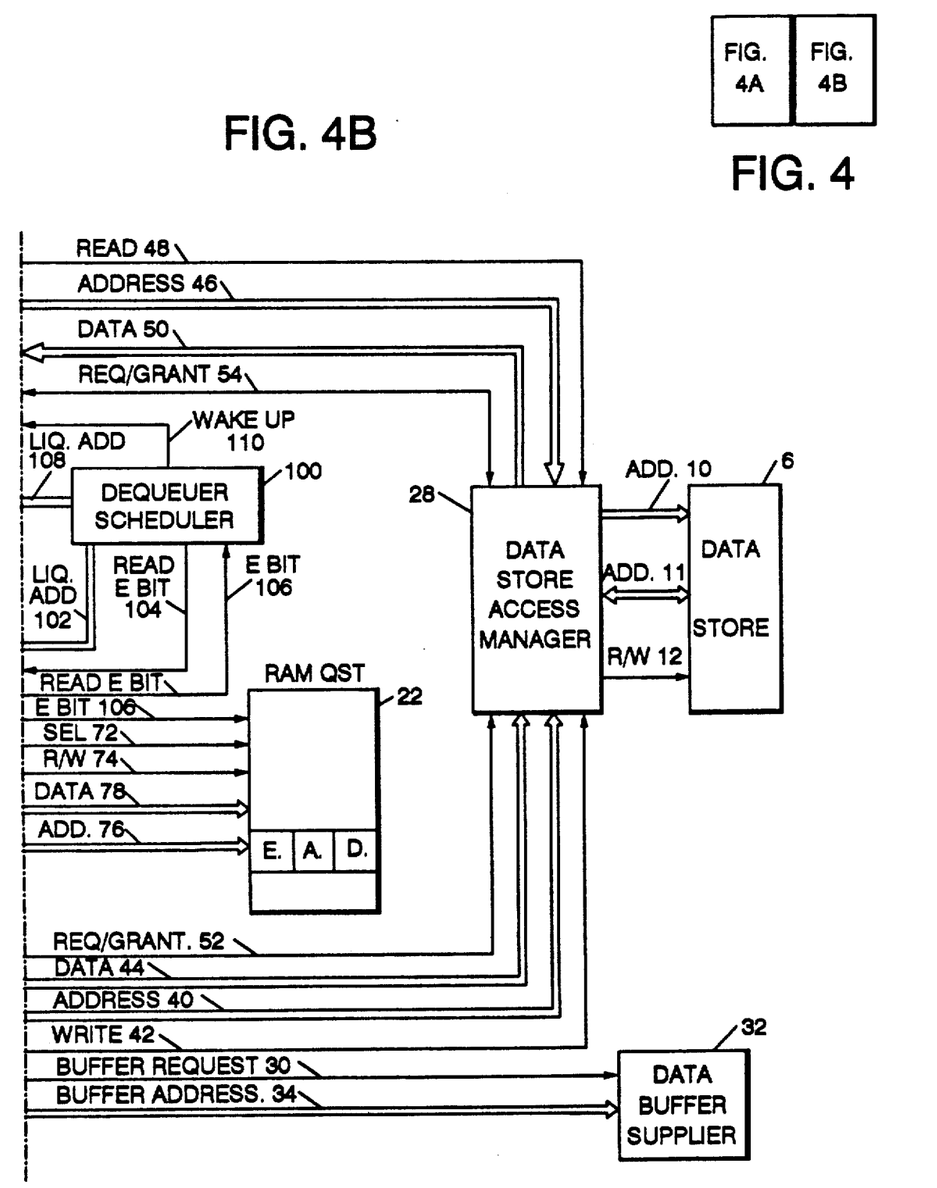
FIGS. 4A and 4B are a more detailed representation of the block diagram of FIG. 1.
Figure 4A:
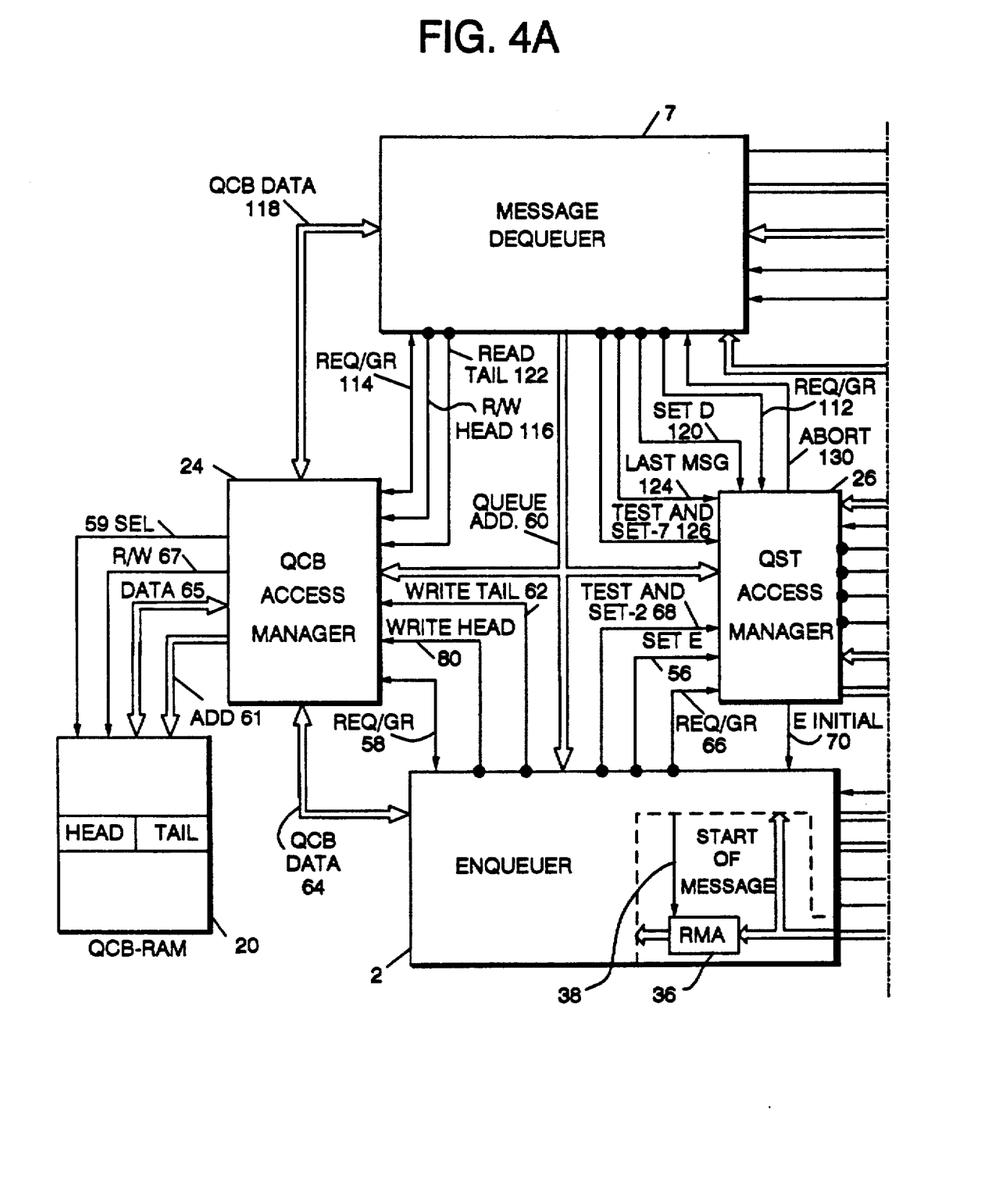

FIG. 4 shows the data store access controller 5 in more details.

It comprises a first random access memory RAM 20 which is separate from the data store 6. This memory 20 is a fast memory used for storing the queue control blocks QCB of the LIQ queues to be built in data store 6. In memory 20, there is one addressable location per queue which can be built in data store 6. This allows the queue control blocks to be accessed, even if the data store 6 is being written or read.

A second random access memory 22 which also comprises an addressable location per queue which can be built is used to store the queue status of each queue, as will be described later on. This memory is called the queue status table memory QST.

The two memories 20 and 22 can be accessed by the enqueuer 2 and the dequeuer 7 by means of access managers 24 and 26, respectively.

The accesses to data store 6 by enqueuer 2 and dequeuer 7 are controlled by data store access manager 28 which provides the addresses to be accessed on bus 10, a read/write control signal on line 12. The data read from data store 6 or to be written into data store 6 are carried by data bus 11.

Each time the enqueuer 2 has assembled 256 bytes of a message, it activates the buffer request line 30. Data buffer supplier device 32, is responsive to the buffer request signal to provide the address of a free buffer to enqueuer 2. This operation will not be described any further since it is not part of the subject invention.

The address of the first buffer of the message is saved in a received message address register RMA 36 under control of the "start of message" signal generated by enqueuer 2 on line 38.

Enqueuer 2 provides its data store addresses on bus 40, a write control signal on line 42 and the data to be written into the data store 6 on bus 44, to the data store access manager 28.

Also, dequeuer 7 provides its data store addresses on bus 46, a read control signal on line 48 to the data store access manager 28, the data read from the addressed location in data store 6 are provided to dequeuer 7 through data bus 50.

The data store access from enqueuer 2 and dequeuer 7 are initiated by a request signal on a request line of busses 52 and 54. The access is granted by data store access manager 28 which returns a grant signal through bus 52 and 54. Priority is given by data store access manager 28 to the request originating from the enqueuer 2.

The QST memory 22 stores a table which allows improved test and set functions to be performed in order to solve the contention situations. Each queue has a corresponding entry in the table.

Three status bits are needed: Empty status bit E, Abort status bit A and dequeuer active bit D.

The E bit indicates the status of the queues, A and D bits are used to manage the contention situations.

The contention can appear when the dequeuer 2 is dequeuing the last message while the enqueuer 7 is enqueuing a new one. Because the enqueuer has priority, the contention is solved by aborting the process by the dequeuer 7, as will be explained later on.

The three status bits in memory have the following functions:

E bit: this bit indicates if the corresponding queue is empty or not.

$E = 0$ empty state $E = 1$ not empty state

This bit is set to the not empty state when the first message is enqueued in the queue, by activating a set E bit signal on line 56 which is provided to QST access manager 26 to cause the E bit to be written into memory 22.

D bit: is set by the dequeuer when it begins to dequeue a message.

$D = 0$ dequeuer not active state $D = 1$ dequeuer active state

A bit: this bit is set by the enqueuer when it finds the D bit active to signal that it is enqueuing a message. If the dequeuer was dequeuing the last message it must abort it process. This bit is set by the enqueuer 2 and reset by the dequeuer at right times as will be described later.

$A = 0$ not abort state $A = 1$ abort state

Figure 5:
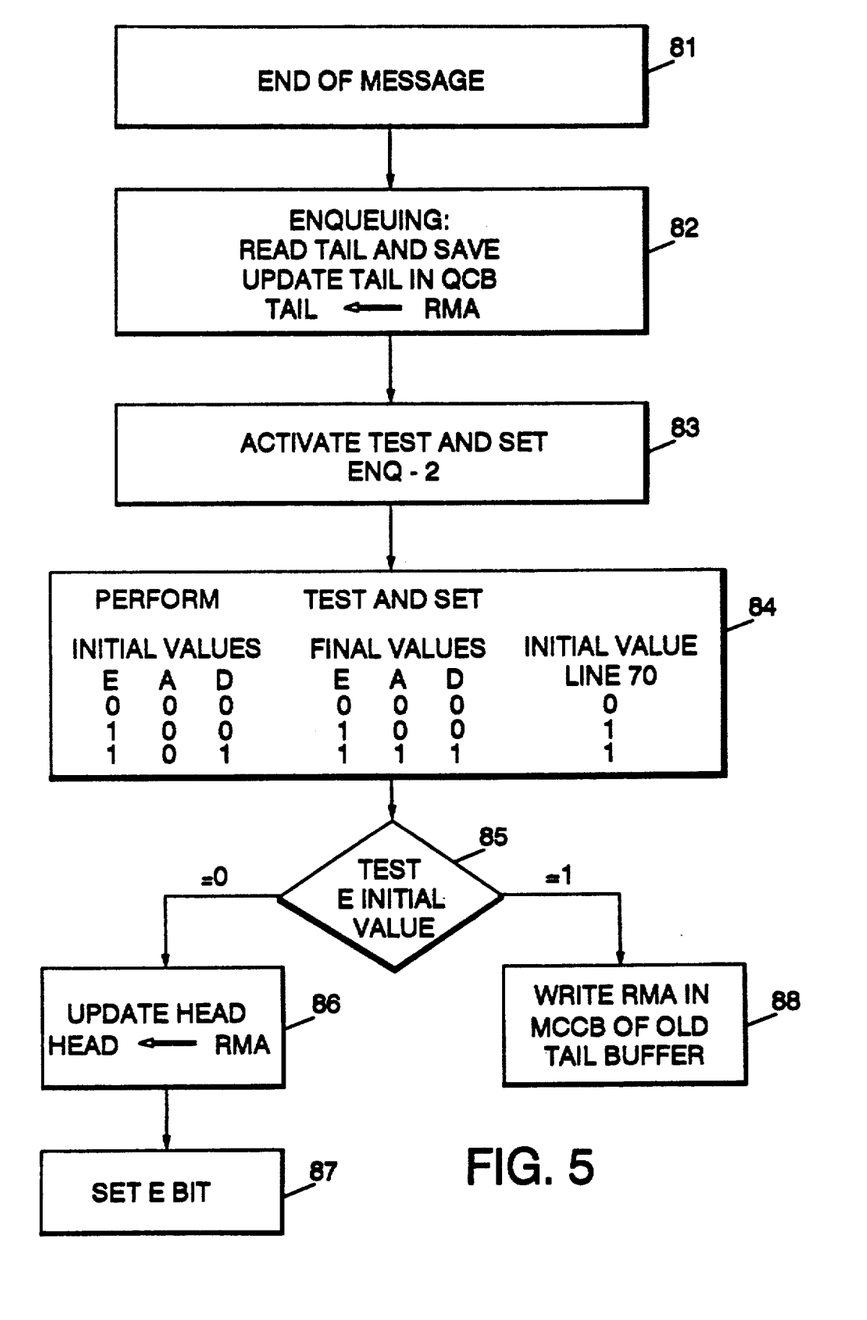
FIG. 5 shows the logical operations which are performed by the enqueuer device 2 and memory access managers 24 and 26 to enqueue a message to a queue.

Message enqueuer 2 and access managers 24 and 26 comprise logic circuitry arrangements not shown in FIG. 4, which perform successive operations described in FIG. 5.

All the operations which are performed for chaining the received messages as shown in FIG. 3 are not described since they are not part of the present invention. The contention problems can only arise when the enqueuing operation is performed, i.e. when the queue control blocks are updated.

When enqueuer 2 detects the end of message (operation 81) it causes the message which has been stored in chained buffers in data store 6 to be enqueued to a LIQ queue LIQ-i assigned to the message receiving bus 1-i (operation 82).

This is done by updating the TAIL field of the queue control block QCB-i and writing in this block the address saved in RMA register 36.

Enqueuer 2 raises the request line of request/grant bus 58 to QCB access manager 24. QCB access manager grants the QCB access by returning a grant signal on grant line of bus 58 and a selection signal on selection line 59 to memory 20.

When receiving the grant signal, enqueuer 2 provides the LIQ-i address on address bus 60 to QCB access manager 24, together with a write control signal on line 62 and the content of the RMA register on QCB data bus 64 to cause the tail field of the QCB to be updated. QCB access manager 24 provides the write control signal on Read/Write line R/W 67, the LIQ-i address on address bus 61 and the RMA data on data bus 65 to memory 20.

Then, enqueuer 2 sends a request signal to QST access manager 26, on request line of request/grant bus 66. QST access manager returns a grant signal on grant line of bus 66 to grant the access of the QST access manager 64 to the enqueuer. When it receives the grant signal the enqueuer activates the Test and Set- 2 line 68 (operation 83). The QST access manager is responsive to the activation of line 68 to perform a test and set function (operation 84) which consists in reading the RAM QST-i position assigned to LIQ-i and writing new values in this position as a function of the initial read values and returning the E initial read value to the enqueuer 2 through initial E value line 70, as indicated below:

TABLE 1

| Initial values (read) | | | Test and Set Enqueuer 2 Final values (written) | | | E initial value (line 70) |
|---|---|---|---|---|---|---|
| E | A | D | E | A | D | |
| 0 | 0 | 0 | 0 | 0 | 0 | 0 |
| 1 | 0 | 0 | 1 | 0 | 0 | 1 |
| 1 | 0 | 1 | 1 | 1 | 1 | 1 |

The QST access manager 26 access the RAM QST 22, by sending a select signal on line 72, a read/write control signal on line 74, the queue address on address bus 76. The read data bits are provided through data bus 78 to the QST manager 26 which writes the final values E, A, D. Then the enqueuer 2 tests the E initial value on line 70 (operation 85).

If this value is equal to 0, it accesses the QCB access manager 24, sends the queue address on bus 60 and the content of register RMA 32 on the QCB data bus 64 to write the received message address in the head field of the queue control block (operation 86). Then, it activates the set E bit line 56 to set the E bit to 1 in the QST table (operation 87).

If the initial E bit on line 70 is found equal to 1, the enqueuer 2 requests an access to the data store access manager to write the content of the RMA register 36 into the MCCB of the old tail register, the address of which was saved in operation 82.

Figure 6:
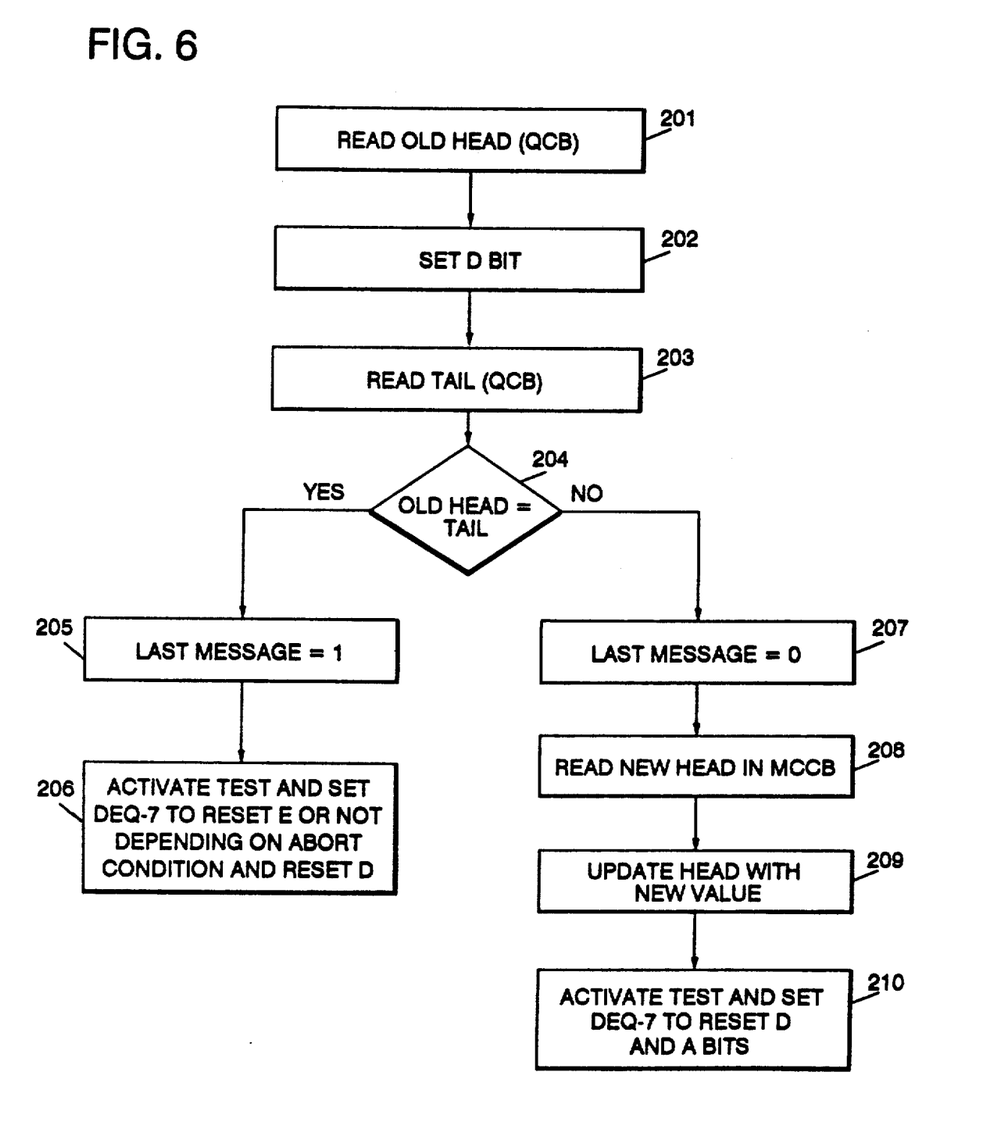
FIG. 6 shows the logical operations which are performed by the dequeuer device 7 and memory access managers 24 and 26 to dequeue a message from a queue.

The dequeuing process will now be described in reference to FIG. 6.

The process is started by a dequeuer scheduler 100 which successively read the E bit value of each queue in the RAM QST 22. The dequeuer scheduler 100 sends the LIQ addresses on bus 102 together with a read E bit control signal on line 104 to QST access manager 26. QST access manager access the RAM QST 22 to perform the requested read operation and provides the E bit to scheduler 100 through line 106. The scheduler 100 provides the address of the queue for which the E bit is found equal to 1 to the dequeuer 7 through bus 108 together with a wake up signal on line 110. This signal causes the dequeuing process to be initiated for the LIQ queue.

In a first operation 201, the dequeuer makes an access to the QCB access manager 24 by activating the request line of bus 114 and when the QCB access manager 24 returns the grant signal on the grant line of bus 114, dequeuer 7 provides the queue address on bus 60, a read head control signal on line 116 to read the address of the first message in the queue, which is provided to the dequeuer by QCB access manager through data bus 118.

Then, the dequeuer sets the D bit to 1 by activating the set D bit line 120 (operation 202 as QST access manager 26).

Then, the dequeuer accesses the QCB access manager 24 to read the QCB tail, by sending the queue address on bus 60 and activating line 122 (operation 203).

The old LIQ head red and saved in operation 201 is compared to the LIQ tail (operation 204).

If an equality is detected, meaning that the last message is being dequeued, last message line 124 is activated (set to 1), (operation 205), then a test and set line 126 is activated to initiate a test and set function to reset the E bit or not depending on the abort condition bit, as indicated in the table below (operation 206).

If an inequality is detected, last message line 124 is set to 0, (operation 207) and dequeuer accesses the data store access manager 28 to read the address of the new queue head in the MCCB of the buffer having the address indicated in the old queue head saved at step 201, (operation 208).

Then, the dequeuer accesses the QCB memory 20 to update the queue head field in the QCB RAM 20 by writing the address of the new queue head buffer read in operation 207, in the head field of the queue control block (operation 209).

The test and set line deq-7 126 is activated to reset the D and A bits (operation 210).

The following table indicates the final values which are written into the QST table 22 and the status of the ABORT line 130 depending upon the initial values read from the table 22 when the test and set line 126 is activated (operations 206 and 210) and the status of the last message line 124.

TABLE 2

| Test and Set Dequeuer 7 | | | | | | | |
|---|---|---|---|---|---|---|---|
| Initial values (read) | | | Last message line 124 | Final values (written) | | | Abort line 130 |
| E | A | D | | E | A | D | |
| 1 | x | 1 | 0 | 1 | 0 | 0 | 0 |
| 1 | 0 | 1 | 1 | 0 | 0 | 0 | 0 |
| 1 | 1 | 1 | 1 | 1 | 0 | 0 | 1 |

When the abort line 130 is set to 1, the dequeuer aborts its process.

We claim:

1. A device for managing accesses by an enqueuing means (2) and a dequeuing means (7, 100) to a queue of chained messages stored in a first storing means (6), the position of each queue in said first storing means being indicated in a queue control block, the queue control block including head and tail fields which are accessed by the enqueuing and dequeuing means to write, by said enqueuing means, the starting address of the first chained message into the head and tail fields to enqueue said first message and then to write the starting address of the next chained messages into the tail field to enqueue said next message and, by said dequeuing means, to write the starting address of said chained message in the queue into the head field of a control block each time a message is dequeued from the queue, said device being characterized in that it comprises:

a second storing means (20) for storing the queue control blocks, a third storing means (22) which contains a plurality of queue status bits for each queue, including an empty status (E) having an empty and not empty state indicating whether the queue is empty or not empty, an abort status (A) having an abort state and not abort state and an active status bit (D) per dequeuing means said active status bit having an active state and not active state, said plurality of queue status bits being written by said enquiring and dequeuing control means, said enqueuing control means (24, 26, FIG. 5) being responsive to an enqueue request for accessing said second and said third storing means to first update the tail field in said second storing means assigned to the queue control block for the selected queue with the starting address of the message and then detecting the state of the empty status bit and active status bit to set the abort status bit of the selected queue to the abort state if the empty status bit and active status bit are found in the not empty state and active state, respectively, and if the empty status bit is found in the empty state, to update the head field with the starting address of the message and set the empty status bit to its not empty state, and said dequeuing control means (24, 26, FIG. 6) being responsive to a dequeuing request to access said second and third storing means to set the active state bit of the selected queue to its active state, and then detecting whether the queue contains only one message and, if yes, then testing the abort status bit and aborting the dequeuing operation if the said bit is found in the abort state and performing the dequeuing operation of the message if the said bit is found in the not abort state and setting the empty status bit to its empty state and the active status bit to its not active state.

2. A device according to claim 1, further comprising: first access control means (24) for controlling the accesses to the second storing (20) means; and second access control means (26) for controlling the accesses to the third storing means (22); and said first access control means being responsive to an enqueue request to first read the tail field of the associated said queue control block in said second storing means and to save the value read and then to write the starting message address in the tail field of said queue control block; and said second access control means being responsive to the activation by said enqueuing means of an access control signal (68) when said tail field of said queue control block has been updated, to read the queue status bits in said third storing means and to set the abort status bit to its abort status if the empty status bit and active status bit are found in their not empty and active states, respectively, and to leave them unchanged if they are in any other states; and to provide the empty status bit the said enqueuing means through an initial empty value line (70).

3. The device according to claim 2, wherein: said enqueuing means is responsive to the value of said empty status bit on said initial empty value line (70) to cause said queue control block to be accessed by said first access control means if said empty status bit indicates that said queue was empty, and to write the starting address of the message to be enqueued in the head field of said queue control block and then to cause said queue status bits to be accessed by said second access control means to set the empty status bit to its not empty state.

4. The device according to claim 3, wherein:
each message in said first storing means is associated with a message control block (MCCB) in which the starting address of the next said chained message is stored.

5. The device according to claim 4, wherein:
said enqueuing means is responsive to the value of said empty status bit on said initial empty value line (70) indicating that the said queue to which a message is to be enqueued was not empty, to access said first storing means to write the starting address of the message to be enqueued in the queue control block of the message in said queue identified by the said tail field content of said queue control block.

6. The device according to claim 2 or claim 5, wherein:
said second access control means is responsive to a dequeue request (110) to set the said active status bit for the selected queue to the active state and which is then responsive to a last message signal activated by said dequeuing means on a last message line (124) when said queue contains only one message, to access said third storing means and to read the said status bits of the selected queue and to set the said empty status bit and the said active status bit to the empty state and to the not active state, respectively, if the said abort bit is in its not abort state and to set the said abort status bit and the said active status bit in the not abort and not active states, respectively, if the abort status bit is in its abort state and to activate an abort line (130) to send an abort control signal to said dequeuing means, so as to cause the dequeuing process to be aborted.

7. The device according to claim 6, wherein: said last message line is not activated, said head field is updated with the starting address of the next message and said second access control means is then activated by said dequeuing means to set said abort status bit and active status bit to their not abort and not active states, respectively.

8. The device according to claim 7, wherein:
said dequeuing means comprises means (204) for comparing said head and said tail fields read at the beginning of said dequeuing process and activating the said last message line when said fields are found equal.

* * * * *